Aug. 29, 1967 H. N. TATE 3,339,197

PULSED RADAR SYSTEM

Filed July 6, 1966

INVENTOR,
HAROLD N. TATE

BY

ATTORNEYS

United States Patent Office 3,339,197
Patented Aug. 29, 1967

3,339,197
PULSED RADAR SYSTEM
Harold N. Tate, Fairhaven, N.J., assignor to the United States of America as represented by the Secretary of the Army
Filed July 6, 1966, Ser. No. 563,645
3 Claims. (Cl. 343—14)

ABSTRACT OF THE DISCLOSURE

A pulsed radar system wherein a single oscillator is keyed to provide two output frequencies. The signal output at one frequency, the transmitted signal, is of relatively short duration and at a high power level, while the second frequency signal is of relatively low duration and at a low power level. The low power level signal beats with a returned echo signal to provide the IF signal.

---

This invention relates to a radar system and more particularly to an improved pulsed radar system.

Pulsed radar systems utilizing a common antenna for transmitting and receiving customarily employ a separate transmitter and local oscillator frequency generator. In such systems it is necessary that the local oscillator frequency be chosen so as to produce an IF frequency such that the semi-conductor noise produced by the mixer is relatively low. However, when klystrons are utilized as local oscillators, a balanced mixer is required to minimize local oscillator noise. Such balanced mixers are usually rather complex and costly. Also, such pulsed radar systems usually require conventional automatic frequency control (ACF) circuits to maintain a constant IF frequency.

It is an object of the present invention to provide an improved pulsed radar system wherein the above limitations are overcome.

It is another object of the present invention to provide an improved pulsed radar system utilizing a single ended mixer.

It is still another object of the present invention to provide an improved pulsed radar system simpler in construction and wherein transmitter and local oscillator power consumption is minimized.

In accordance with the present invention, there is provided a pulsed radar system having a voltage-tuned oscillator, a common antenna for transmission and detection, a duplexer, and a receiver which includes prescribed IF amplifier stages. Included is a PRF source for generating PRF pulses having a prescribed period and gating means in circuit with the voltage-tuned oscillator and responsive to the PRF pulses whereby the oscillator is periodically activated for a prescribed duration of the PRF period and cut-off for the remainder of the PRF period. The oscillator is voltage-tuned by the output of the gating means to generate a first frequency signal, the transmitter signal, at a relatively high power level at substantially the beginning of the activated period and a second frequency signal at a relatively low power level for the remainder of the activated period. The high power frequency signal duration is very short compared to the duration of the low power frequency signal, and the frequency signals are chosen such that the difference in frequency therebetween is the IF frequency of the receiver. The pulsed radar system operates in the conventional manner. The transmitted high power frequency signal $F_1$ is blocked from the receiver and the returned echo signal is passed to the receiver by conventional duplex action. The low power frequency signal $F_2$ derived from the oscillator is passed to the receiver at all times by the duplexer and as a result frequency $F_2$ will beat with the incoming target signal to produce the receiver IF frequency.

For a better understanding of the invention, together with other and further objects thereof, reference is had to the following description taken in connection with the accompanying drawing in which.

Figure 1:
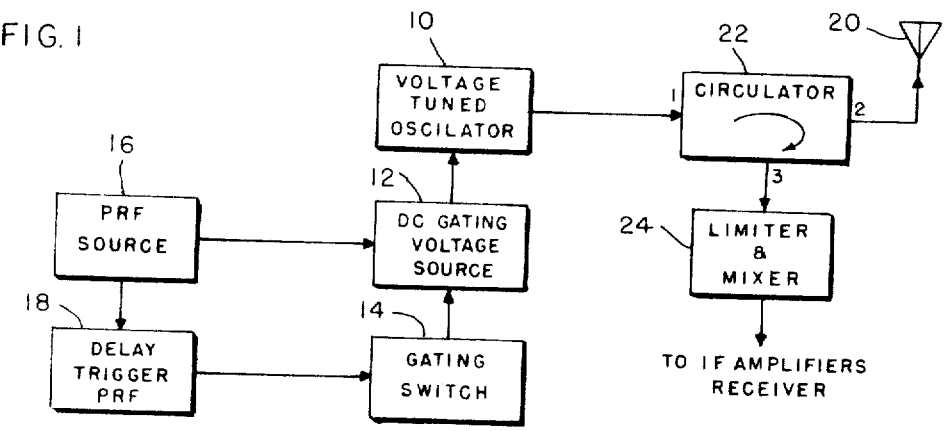
FIG. 1 is a schematic block diagram of the present invention.

Referring now to FIG. 1 of the drawing, there is shown at 10 a voltage-tuned oscillator capable of operating at relatively high and low power level modes. In the relatively high level operating mode, oscillator 10 generates the high power transmitter frequency signal $F_1$. In the relatively low level operating mode, the oscillator 10 generates a preselected frequency signal $F_2$ at relatively low power. The high power transmitter frequency signal $F_1$ and the low power frequency signal $F_2$ are selected such that their differences $(F_1-F_2)$ is equal to the IF frequency of the radar receiver system. The voltage-tuned oscillator shown in block 10 is so well known in the art that no further description thereof is believed to be necessary. The respective driving voltages applied to voltage-tuned oscillator 10 for generating frequencies $F_1$ and $F_2$ are derived from a DC (direct-current) gating voltage source 12 whose gated output is controlled by the output of a suitable gating switch 14 and the output trigger pulses from PRF generator 16. The trigger pulse output of PRF source 16 is also applied as a trigger pulse to gating switch 14 through a trigger delay circuit 18. The PRF trigger pulse derived from source 16 is assumed to have a pulse repetition period $T$, where $T = 1/F_r$, $F_r$ being the pulse repetition frequency (PRF). DC gating voltage source 12 is responsive to the PRF trigger pulses such that for each applied PRF trigger pulse the DC gating voltage source 12 generates one cycle of a rectangular voltage signal having respective relatively high and low DC voltage levels for each PRF period $T$. The high DC voltage level duration of the rectangular gate is substantially that of the total effective receive time $R_t$ for targets within a preselected range. For the duration of $R_t$ the high DC voltage level of the rectangular gate is of a magnitude such that oscillator 10 is voltage-tuned to generate the low power mode at frequency $F_2$. The relatively low DC voltage level of the rectangular gate is of such a magnitude that when applied to oscillator 10 it is maintained at cut-off and hence is not operative for the duration of the low voltage level gate. This interval of the PRF period $T$ is referred to as dead time $D_t$ and is of longer duration than $R_t$. As shown above, the PRF trigger pulse is also applied to a gating switch 14 after a slight delay. Gating switch 14 is thus energized at the same PRF rate as that of DC gating voltage source 12. The gating switch 14 is adapted to produce a DC signal voltage of very narrow duration $\delta$ and having a magnitude such that when superposed on the relatively high voltage level of the rectangular gate output of DC gating source 12 and applied to oscillator 10, oscillator 10 generates the high power mode transmitter frequency $F_1$ for the prescribed duration $\delta$. The slight delay provided by circuit 18, although not absolutely essential, is desired in order to compensate for any rise-time delay in the leading edge of the rectangular signals derived from DC gating voltage source 12. Thus, at substantially the start of the duration $R_t$, oscillator 10 generates a transmitter frequency $F_1$ for the duration $\delta$, which is only a very small fraction of $R_t$, and for the rest of the $R_t$ period oscillator 10 generates the low power mode frequency $F_2$. As noted above, during the dead time $D_t$, oscillator 10 will not be operative or activated. As shown, the output of oscillator 10 is applied to a common antenna 20 through ports 1 and 2 of a three-port circulator 22. Port 3 of circulator 22 is fed to a conventional limiter-mixer 24, the output of which is fed to the IF amplifier stage of a conventional radar receiver (not shown). For the duration δ, the high power transmitter frequency signal $F_1$ passes through port 2 of circulator 22 to antenna 20 but is blocked from passing to the receiver by the limiting action of mixer stage 24. The low power mode frequency signal $F_2$ will pass through ports 1 and 2 of circulator 22 to antenna 20, and because of the lower power level thereof, a portion of $F_2$ will be reflected into limiter-mixer stage 24 via port 3 of circulator 22. Since the limiter does not function at low power levels, the frequency signal $F_2$ will be present in the limiter-mixer stage 24 to beat with echo target signals detected by antenna 20 and passed through circulator ports 2 and 3 to limiter-mixer stage 24. As is well known, the return target or echo signals may be at frequencies $F_1$, $F_2$, $(F_1+F_2)\pm F_d$, or $(F_1-F_2)\pm F_d$ where $F_d$ is the doppler frequency.

Figure 2:
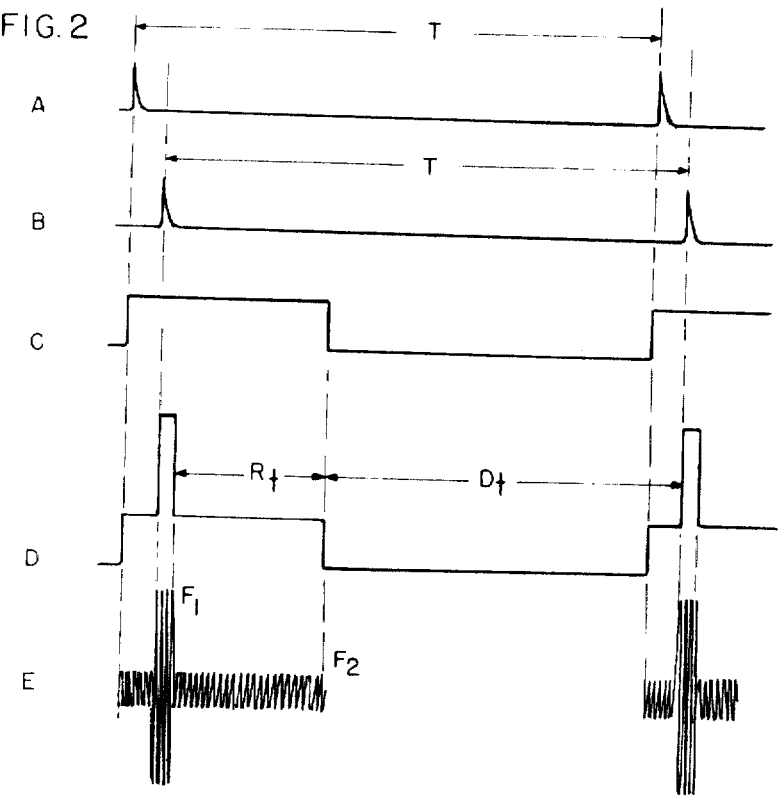
FIG. 2 shows a group of explanatory curves for describing the operation of the system shown in FIG. 1.

In discussing the operation of the invention, reference is made to FIG. 2. FIG. 2A illustrates the PRF trigger pulses derived from source 16 with a period T. FIG. 2B shows the slightly delayed trigger signal, at the PRF rate, which is applied to gating switch 14. FIG. 2C illustrates the relative DC voltage levels derived from DC gating voltage source 12 in response to the PRF trigger pulses of FIG. 2A. FIG. 2D shows the transmitter frequency activating pulse 26 superposed on the output of DC gating voltage source 12 for the duration δ. As hereinabove explained, the receive time $R_t$ starts immediately after the transmission pulse 26 is terminated. Thus for the duration δ the high power transmission frequency signal $F_1$ is passed through ports 1 and 2 of circulator 22 to antenna 20. The high power transmission energy is blocked from the receiver by the limiting action of limiter-mixer stage 24. For the rest of the duration $R_t$, oscillator 10 generates the low power mode frequency signal $F_2$ and during this time the low power mode frequency $F_2$ passes through port 3 of circulator 22 to the limiter-mixer stage 24. FIG. 2E shows the relationship between the transmitter frequency $F_1$ and the low power mode frequency $F_2$. If any target signal is detected during the period $R_t$, the signal will be at a frequency $F_1$, $F_2$, $(F_1+F_2)\pm F_d$, or $(F_1-F_2)\pm F_d$ where $F_d$ is the doppler frequency. The IF frequency is adapted to accept the lower side band frequency $(F_1\pm F_d)-F_2$ in the conventional manner. When $F_d$ the doppler frequency is zero, the IF amplifier will then select $(F_1-F_2)$. If the doppler frequency is present, conventional means (not shown) may be utilized to detect the doppler signal and provide visual displays of moving targets.

While there has been described what is at present considered to be the preferred embodiments of this invention, it will be obvious to those skilled in the art that various changes and modifications may be made therein without departing from the invention, and it is therefore aimed in the appended claims to cover all such changes and modifications as fall within the true spirit and scope of the invention.

What is claimed is:

1. In a pulsed radar system including a voltage-tuned oscillator, a common transmit-receive antenna, a duplexer, and a receiver having prescribed IF amplifier stages;

a PRF source for generating PRF pulses having a prescribed period, a DC gating voltage source in circuit with said oscillator and responsive to said PRF pulses for producing respective DC voltage levels whereby said oscillator is periodically activated for a prescribed duration of said PRF period and cut-off for the remainder of said PRF period, said oscillator being voltage-tuned by the output of said gating voltage source to generate a first frequency signal at a relatively high power level at substantially the beginning of said activated period and a second frequency signal at a relatively low power level for the remainder of said activated period, a gating switch energized by said PRF pulses for producing DC pulses of relatively large magnitude and of relatively short duration with respect to the duration of said low power frequency signal, the large magnitude output voltage being superposed on the activating output voltage level of said DC gating voltage source whereby said oscillator is voltage-tuned to generate said high power frequency signal only for said short duration, said first and second frequency signals being chosen such that the difference in frequency therebetween is the IF frequency of said receiver.

2. The system in accordance with claim 1 and further including means for delaying the application of said PRF pulses to said gating switch.

3. The system in accordance with claim 1 wherein said oscillator activated period is substantially the duration of the prescribed receive time of said radar system.

References Cited

UNITED STATES PATENTS

| | | | |
|---|---|---|---|
| 2,933,700 | 4/1960 | Hoffman | 343—17.5 X |
| 2,977,589 | 3/1961 | Gutton | 343—8 X |
| 3,101,470 | 8/1963 | Vosburgh et al. | 343—14 X |
| 3,216,011 | 11/1965 | Chatelain et al. | 343—13 |
| 3,270,342 | 8/1966 | Stemmer | 343—17.1 X |
| 3,298,025 | 1/1967 | Fumea | 343—17.1 |

RODNEY D. BENNETT, *Primary Examiner.*

J. P. MORRIS, *Assistant Examiner.*